(12) United States Patent  (10) Patent No.: US 7,487,875 B2
Zimmerman et al.  (45) Date of Patent: Feb. 10, 2009

(54) CANDLE FILTER ASSEMBLY AND CANDLE FILTER ELEMENT

(75) Inventors: William Chance Zimmerman, Overland Park, KS (US); John H. Bakker, Tulsa, OK (US)

(73) Assignee: General Electric Company, Schenectady, NY (US)

( * ) Notice: Subject to any disclaimer, the term of this patent is extended or adjusted under 35 U.S.C. 154(b) by 43 days.

(21) Appl. No.: 11/215,209

(22) Filed: Aug. 30, 2005

(65) Prior Publication Data

US 2007/0045173 A1 Mar. 1, 2007

(51) Int. Cl.
 B01D 25/00 (2006.01)
 B01D 25/02 (2006.01)
 B01D 27/00 (2006.01)
 B01D 27/14 (2006.01)
 B01D 29/50 (2006.01)

(52) U.S. Cl. ............... 210/450; 210/323.2; 210/497.01; 210/459; 210/345; 210/442

(58) Field of Classification Search ....................... None
 See application file for complete search history.

(56) References Cited

U.S. PATENT DOCUMENTS

| 1,337,020 | A | * | 4/1920 | Milker ........................ 210/437 |
| 2,010,430 | A | * | 8/1935 | Howard et al. .............. 210/437 |
| 2,432,475 | A | * | 12/1947 | Griffith ....................... 210/437 |
| 2,584,387 | A | * | 2/1952 | Harvuot ...................... 210/437 |
| 2,709,524 | A | * | 5/1955 | Russell et al. ............... 210/441 |
| 3,045,826 | A | * | 7/1962 | Howard et al. .............. 210/443 |
| 5,217,605 | A | * | 6/1993 | Kottke ........................ 210/445 |
| 5,223,136 | A | * | 6/1993 | Gilbert ........................ 210/435 |
| 6,156,213 | A | * | 12/2000 | Dudley et al. ............... 210/791 |
| 6,413,422 | B1 | | 7/2002 | Schumacher |
| 6,428,593 | B1 | | 8/2002 | Bruck et al. |
| 6,451,081 | B1 | | 9/2002 | Alvin |
| 6,464,757 | B2 | | 10/2002 | Zhang et al. |
| 6,468,322 | B1 | | 10/2002 | Alvin et al. |
| 6,471,877 | B1 | | 10/2002 | Murakami et al. |
| 6,627,079 | B2 | | 9/2003 | Koivula |
| 6,630,016 | B2 | | 10/2003 | Koslow |
| 6,652,615 | B2 | | 11/2003 | Quick et al. |
| 6,733,575 | B1 | | 5/2004 | Lefever et al. |
| 6,827,864 | B2 | | 12/2004 | Kangasniemi et al. |

(Continued)

FOREIGN PATENT DOCUMENTS

WO WO 88/06056 * 8/1988

*Primary Examiner*—Krishnan S Menon
*Assistant Examiner*—Madeline Gonzalez
(74) *Attorney, Agent, or Firm*—Armstrong Teasdale LLP (57) ABSTRACT

A candle filter assembly for a filter device includes, in an exemplary embodiment, a tubular core having an outer surface and an inner surface, and including a plurality of openings extending therethrough, a filter media supported by the core defining a core and filter media subassembly, and a drain pipe including a plurality of openings extending therethrough to permit fluid to flow between an outer surface of the drain pipe and the inside of the drain pipe. The drain pipe is located inside the core. The candle filter assembly also includes an end cap, a first sealing block including a drain pipe opening. The drain pipe extends through the drain pipe opening in the first sealing block. The candle filter assembly further includes a compression nut threadingly engaging the drain pipe extending through the first sealing block.

18 Claims, 5 Drawing Sheets

U.S. PATENT DOCUMENTS

| | | |
|---|---|---|
| 6,843,821 B2 | 1/2005 | Steigert |
| 6,854,601 B2 | 2/2005 | Patil |
| 6,860,394 B1 | 3/2005 | Mueller et al. |
| 6,863,868 B1 | 3/2005 | Alvin |
| 6,866,704 B2 | 3/2005 | Koslow |
| 6,872,310 B2 | 3/2005 | Trotzki et al. |

* cited by examiner

CANDLE FILTER ASSEMBLY AND CANDLE FILTER ELEMENT

BACKGROUND OF THE INVENTION

This invention relates generally to liquid filtration device assemblies, and more particularly, to a filter element assembly that improves the sealing of the filter device.

Various apparatuses and methods have been utilized for removing suspended contaminants from a flowing fluid. In general, the contaminated fluid is passed through a porous filtering media by an external pressure or an external force. The pore size of the porous filtering media is selected to permit the passage of the fluid therethrough while inhibiting the flow of contaminants through the porous filtering media. The contaminants are blocked by the porous filter media while the fluid passes through the porous filter media.

After a period of time, the contaminants collected by the filter media overlay the pores of the porous filter media thereby blocking the pores and reducing the passage of the fluid through the filter media. The blockage of the pores of the filter media by the collected contaminants reduce the flow rate of the fluid through the fluid filter thereby rendering the fluid filter undesirable for further use. In many cases, the fluid filter is discarded and replaced with a new fluid filter to reestablish the desired flow rate of the fluid in the fluid filtering process.

In a typical candle filter, a porous filter media is secured to a filter support or the like for mounting or suspending the filter media. In the case of a cylindrical filter, the filter media is formed into a cylindrical configuration and a first and a second cylindrical end of the filter media is bonded to a respective first and a second filter mounting member such as a first and a second end cap. The first and second end caps mount the filter media relative to a fluid input source and a fluid output source.

In many cases, a welding process is used for affixing the first and second cylindrical ends of the filter media to the first and second end caps. The welding process is accomplished by first placing the filter media on a supporting core. The first and second cylindrical ends of the filter media are swaged to compact the filter media onto an underlying supporting core. A first and a second welding ring are welded to the compacted first and second ends of the filter media. Finally, the first and second end caps are welded to the first and second welding rings. The compacting and welding of the first and second cylindrical ends of the filter media essentially destroyed all filtering capability of the filter media near the compacted ends of the filter media.

Known candle filter element assemblies also use clamps to affix the candle filter media onto piping header and/or support core. These clamps are typically made from metals and are subject to chemical attack, mechanical wear, and damage from adjacent clamps. Also, the clamps can damage the filter media by cutting into the filter media surface or scratching adjacent filter media. Also, the amount of time required to assemble the complete filtering device using known clamps is high resulting in high expenses, and can only occur with the filtering device off-line, again incurring added expense.

BRIEF DESCRIPTION OF THE INVENTION

In one embodiment, a candle filter assembly for a filter device is provided. The candle filter assembly includes a tubular core having an outer surface and an inner surface, and including a plurality of openings extending therethrough, a filter media supported by the core defining a core and filter media subassembly, and a drain pipe including a plurality of openings extending therethrough to permit fluid to flow between an outer surface of the drain pipe and the inside of the drain pipe. The drain pipe is located inside the core. The candle filter assembly also includes an end cap and a first sealing block including a drain pipe opening. The drain pipe extends through the drain pipe opening in the first sealing block. The candle filter assembly further includes a compression nut threadingly engaging the drain pipe extending through the first sealing block.

In another embodiment, a liquid filtration device is provided. The liquid filtration device includes a filter housing, a removable housing cover coupled to and sealing the filter housing, a filter support element positioned inside the filter housing, and at least one candle filter assembly mounted to the filter support element and positioned inside the filter housing. Each candle filter assembly includes a tubular core having an outer surface and an inner surface, and including a plurality of openings extending therethrough, a filter media supported by the core defining a core and filter media subassembly, and a drain pipe including a plurality of openings extending therethrough to permit fluid to flow between an outer surface of the drain pipe to the inside of the drain pipe. The drain pipe is located inside the core. The candle filter assembly also includes an end cap and a first sealing block including a drain pipe opening. The drain pipe extends through the drain pipe opening in the first sealing block. The candle filter assembly further includes a compression nut threadingly engaging the drain pipe extending through the first sealing block.

DETAILED DESCRIPTION OF THE INVENTION

A candle filter assembly for use in a filtration device is described below in detail. The candle filter assembly includes, in an exemplary embodiment, a filter media mounted on a cylindrical outer core. The outer core is positioned between a top sealing block and a bottom end cap with a drain pipe extending from the bottom end cap through the middle of the outer core and through the top sealing block. A compression nut is threaded onto the end of the drain pipe to secure the top sealing block, bottom end cap, outer core, filter media, and drain pipe together. The candle filter assembly provides for uniform cake formation, equal flow distribution over the length of the filter candle, effective back pulse flush for optimum cake removal, and easy instillation of the filter media without the use of clamps which can damage the filter media.

Figure 1:
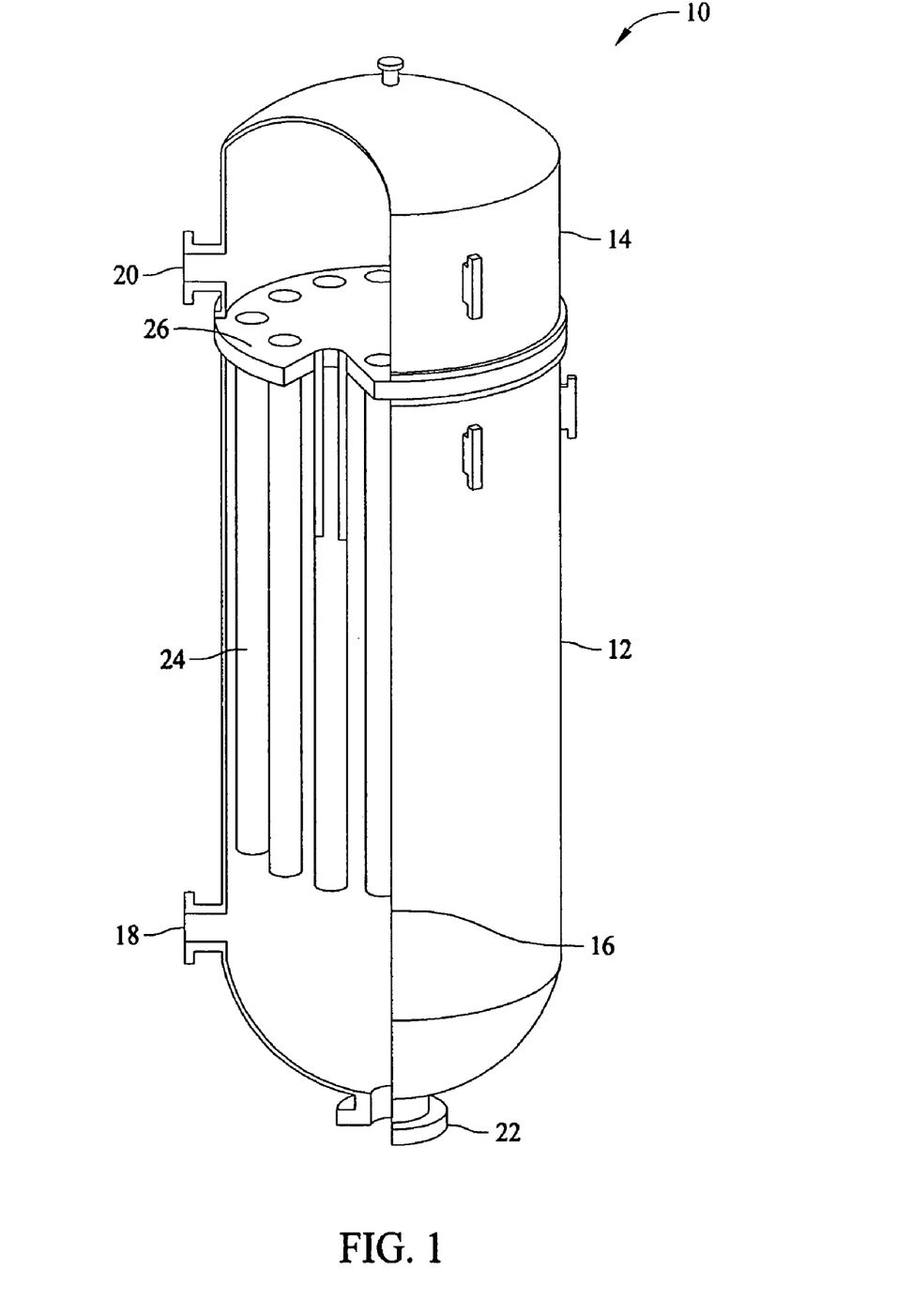
FIG. 1 is a perspective cut-away illustration of a filtration device.

Referring to the drawings, FIG. 1 is a perspective cut-away illustration of a filtration device 10 in accordance with an exemplary embodiment. Filtration device 10 includes a housing 12 and a removable cover 14 that attaches to housing 12 to define a housing cavity 16. Housing 12 includes a fluid inlet 18 to permit the fluid to be filtered to enter filtering device 10, and a fluid outlet 20 to permit the filtrate to exit filtering device 10. A filter cake discharge outlet 22 in housing 12 permits the removal of the filter cake from filtering device 10 after back flushing filtration device 10. A plurality of candle filter element assemblies 24 are located in housing cavity 16 and are mounted to a filter support element 26, for example, a tube sheet, which is in turn mounted inside housing 12. In an alternate embodiment, filter support element 26 is a header to which candle filter assemblies 24 are mounted.

In use, fluid enters filtering device 10 through fluid inlet 18 in housing 12 under pressure and passes through candle filter assemblies 24. Solids suspended in the flowing fluid are separated from the fluid and are deposited on candle filter element assemblies 24 as filter cake. The filtrate passes through filter assemblies 24 and exits filter device 10 through fluid outlet 20. Periodically the filter cake is removed from filter assemblies 24 by, for example, back washing or back pulsing. The removed filter cake is discharged from filter device 10 through an open discharge outlet 22.

Figure 2:
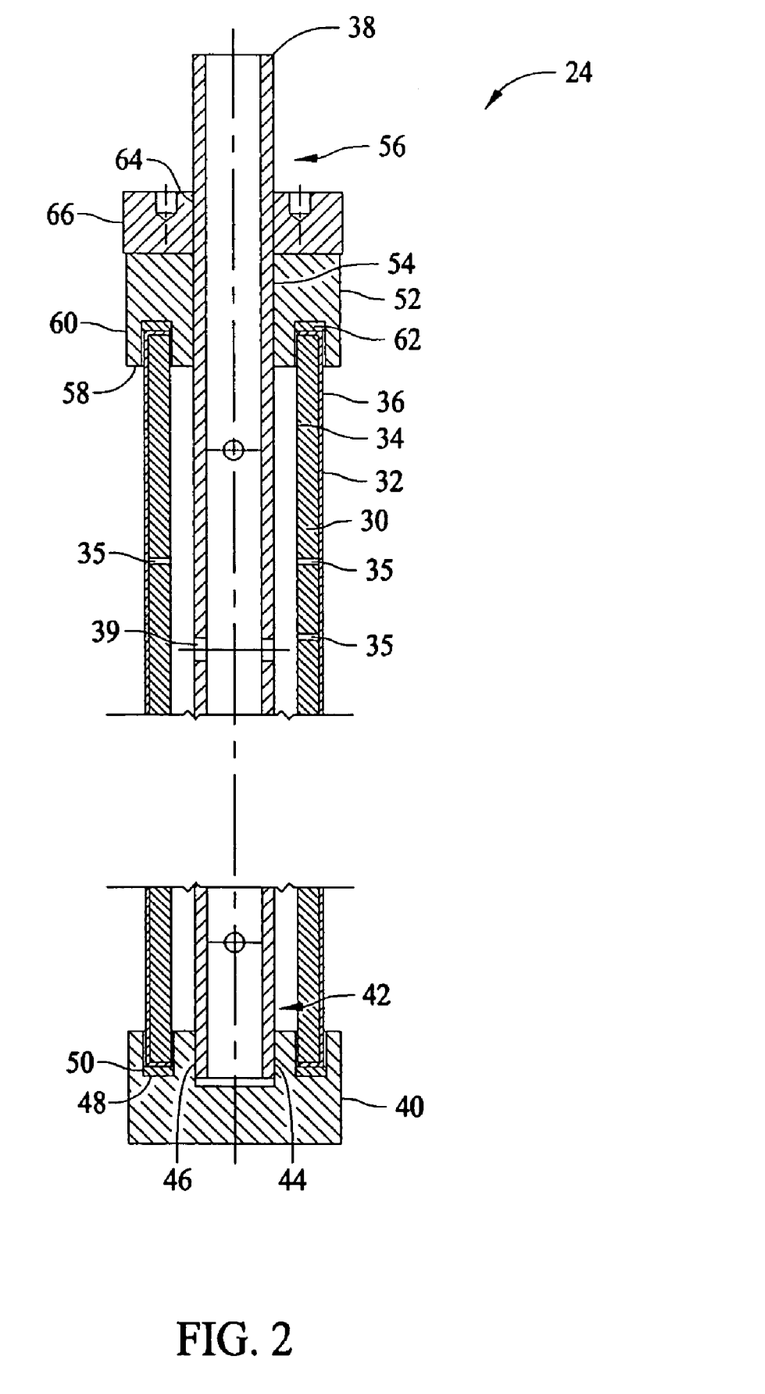
FIG. 2 is schematic sectional illustration of the candle filter assembly shown in FIG. 1 in accordance with an embodiment of the present invention.
Figure 3:
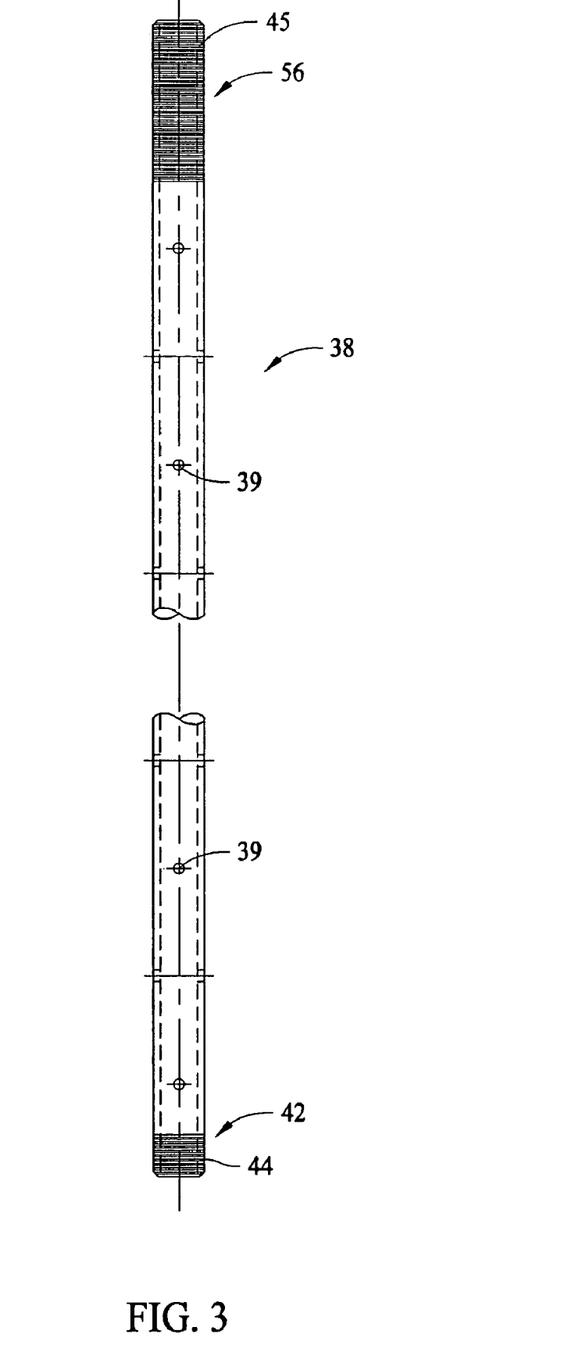
FIG. 3 is a side schematic illustration of the drain pipe shown in FIG. 1.

FIG. 2 is schematic sectional illustration of candle filter element assembly 24. Referring to FIG. 2, candle filter element assembly 24 includes, in the exemplary embodiment, a perforated tubular or cylindrical outer core 30 having an outer surface 32, an inner surface 34 and a plurality of openings 35 extending through outer core 30 between outer surface 32 and inner surface 34. In an alternate embodiment, outer core 30 can be a porous ceramic structure. A filter media 36 surrounds outer surface 32 of outer core 30. A drain pipe 38 having a plurality of drain openings 39 is positioned inside outer core 30 and is attached to a bottom end cap 40. Drain pipe 38 can be attached to bottom end cap 40 by any suitable method, for example, with threads, adhesive bonding and/or welding. Referring also to FIG. 3, in the exemplary embodiment, a first end portion 42 of drain pipe 38 includes a plurality of threads 44 and bottom end cap 40 includes a threaded bore 46 extending partway into bottom end cap 40 that is sized to threadingly engage first end portion 42 of drain pipe 38. Drain pipe 38 is attached to bottom end cap 40 by screwing threaded end portion 42 into threaded bore 46. Bottom end cap 40 also includes an annular groove 48 sized to receive outer core 30 and filter media 36. A compressible seal gasket 50 is positioned in groove 48 to seal the outer core 30 and bottom end cap 40.

A top sealing block 52 includes a drain pipe opening 54 extending therethrough that is sized to permit a second end portion 56 of drain pipe to slidably extend through top sealing block 52. Bottom surface 58 of top sealing block 52 includes an annular groove 60 sized to receive outer core 30 and filter media 36. A compressible seal gasket 62 is positioned in groove 60 to seal outer core 30 and top sealing block 52. Second end portion 56 of drain pipe 28 includes a plurality of threads 45 sized to threadingly engage a threaded bore 64 extending through a compression nut 66. Tightening a compression nut 66 moves top sealing block 52 towards bottom end cap 40 which causes filter media wrapped outer core 30 to compress sealing gaskets 50 and 62 positioned in grooves 48 and 60 respectively.

Any suitable material or combinations of materials can be used in making candle filter assembly 24. Particularly, filter medium 36 can be in the form of a membrane, a needled felt, a woven product, a laminate, or a non-laminate that is formed, for example, from expanded polytetrafluoroethylene (ePTFE), and/or polypropylene. Compressible seal gaskets 50 and 62 can be formed, for example, from EPDM and/or polyurethane. Outer core, 30, drain pipe 38, bottom end cap 40, top sealing block 52, and compression nut 66 can be formed from any suitable material, including, but not limited to, metals, for example, stainless steel and titanium, and/or thermoplastic materials, for example, CPVC and/or polyolefins such as polypropylene.

Figure 4:
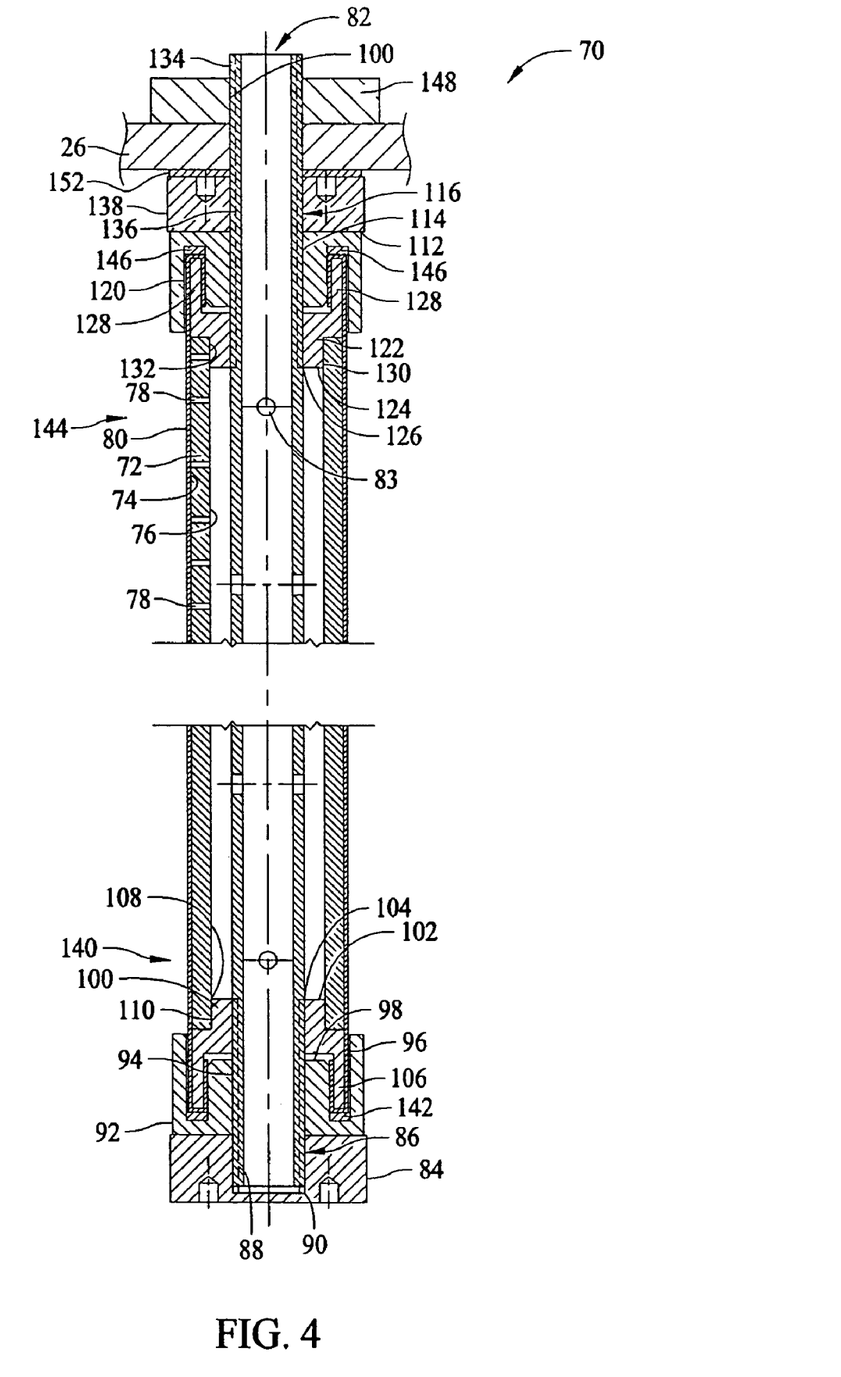
FIG. 4 is a schematic sectional illustration of a candle filter assembly in accordance with another embodiment of the present invention.

FIG. 4 is a schematic sectional illustration of a candle filter element assembly 70 in accordance with another exemplary embodiment. Candle filter element assembly 70, similar to candle filter element assembly 24 described above, includes a tubular outer core 72 having an outer surface 74, an inner surface 76 and a plurality of openings 78 extending through outer core 72 from outer surface 74 to inner surface 76. A filter media 80 surrounds outer surface 74 of outer core 72. A drain pipe 82 having a plurality of drain openings 83 is positioned inside outer core 72 and is attached to a bottom end cap 84. A first end portion 86 of drain pipe 82 includes a plurality of threads 88. Bottom end cap 84 includes a threaded bore 90 extending partway into bottom end cap 84 that is sized to threadingly engage first end portion 86. Drain pipe 82 is attached to bottom end cap 84 by screwing threaded end portion 86 into threaded bore 90.

A bottom sealing block 92 is positioned adjacent bottom end cap 84 and includes an unthreaded opening 94, sized to permit drain pipe 82 to slidably extend therethrough. Bottom sealing block 92 also includes an annular groove 96 in a top surface 98. A bottom counter block 100 is positioned adjacent bottom sealing block 92 so that bottom sealing block 92 is located between bottom counter block 100 and bottom end cap 84. Bottom counter block 100 includes a body portion 102 having a threaded bore 104 extending therethrough that is sized to threadingly engage threaded first end portion 86 of drain pipe 82. An annular projection 106 extends from body 102 that is sized to be received into annular groove 96 of bottom sealing block 92. An annular notch 108 is located in an outer surface 110 of body 102 and is sized to receive outer core 72.

A top sealing block 112 includes an unthreaded drain pipe opening 114 extending therethrough that is sized to permit a second end portion 116 of drain pipe 82 to extend through top sealing block 112. Bottom surface 118 of top sealing block 112 includes an annular groove 120. A top counter block 122 is positioned adjacent top sealing block 112. Top counter block 122 includes a body portion 124 having a threaded bore 126 extending therethrough. An annular projection 128 extends from body 124 that is sized to be received into annular groove 120 of top sealing block 112. An annular notch 130 is located in an outer surface 132 of body 124 and is sized to receive outer core 72. Second end portion 116 of drain pipe 82 includes a plurality of threads 134 sized to threadingly engage threaded bore 126 of top counter block 122 and engage a threaded bore 136 extending through a compression nut 138.

Candle filter element 70 is assembled by threading bottom counter block 100 onto first end portion 86 of drain pipe 82, sliding bottom sealing block 92 onto first end portion 86 and then threading bottom end cap 84 onto first end portion 84 to capture bottom sealing block 92 between bottom end cap 84 and bottom counter block 100. Filter media 80 is positioned around outer surface 74 of outer core 72 with the ends of filter media 80 extending past the ends of outer core 72. Outer core 72 and filter media 80 are positioned so that a proximate end 140 of outer core 72 is received in annular notch 108 of counter block 100 and the extended end of filter media 80 is positioned in annular groove 96 in bottom sealing block 92. A compressible seal gasket 142 is positioned in annular groove 96 between filter media 80 and bottom sealing block 92. Tightening of bottom end cap 84 moves bottom sealing block 92 towards bottom counter block 100 causing annular extension 106 to compress seal gasket 142 forming a seal between filter media 80 and bottom sealing block 92.

Assembly of filter element 70 is continued by threading top counter block 122 onto second end portion 116 of drain pipe 82, sliding top sealing block 112 onto second end portion 116 and then threading compression nut 138 onto second end portion 116 to capture top sealing block 112 between bottom top counter block 112 and compression nut 138. Outer core 72 and filter media 80 are positioned so that a distal end 144 of outer core 72 is received in annular notch 130 of top counter block 122 and the extended end of filter media 80 is positioned in annular groove 120 in top sealing block 112. A compressible seal gasket 146 is positioned in annular groove 120 between filter media 80 and top sealing block 112. Tightening of compression nut 138 moves top sealing block 112 towards top counter block 122 causing annular extension 128 to compress seal gasket 146 forming a seal between filter media 80 and top sealing block 112.

Candle filter element assembly 70 is mounted to pipe sheet 26 by use of a mounting nut 148 which includes a threaded bore 150 sized to engage threaded end portion 116 of drain pipe 82. A compressible seal gasket 152 is positioned between compression nut 138 and pipe sheet 26.

In use, the liquid to be filtered flows through filter media 80 under pressure and solids suspended in the flowing fluid are separated from the fluid and agglomerate on filter media as filter cake. The filtered fluid flows through openings 78 in outer core 72 and into drain pipe 82 through drain openings 83 in drain pipe 83. The filtered fluid exits filter element assembly 70 through second end portion 116 of drain pipe 82, then flows out fluid outlet 20 (see FIG. 1) of filtration device 10.

Figure 5:
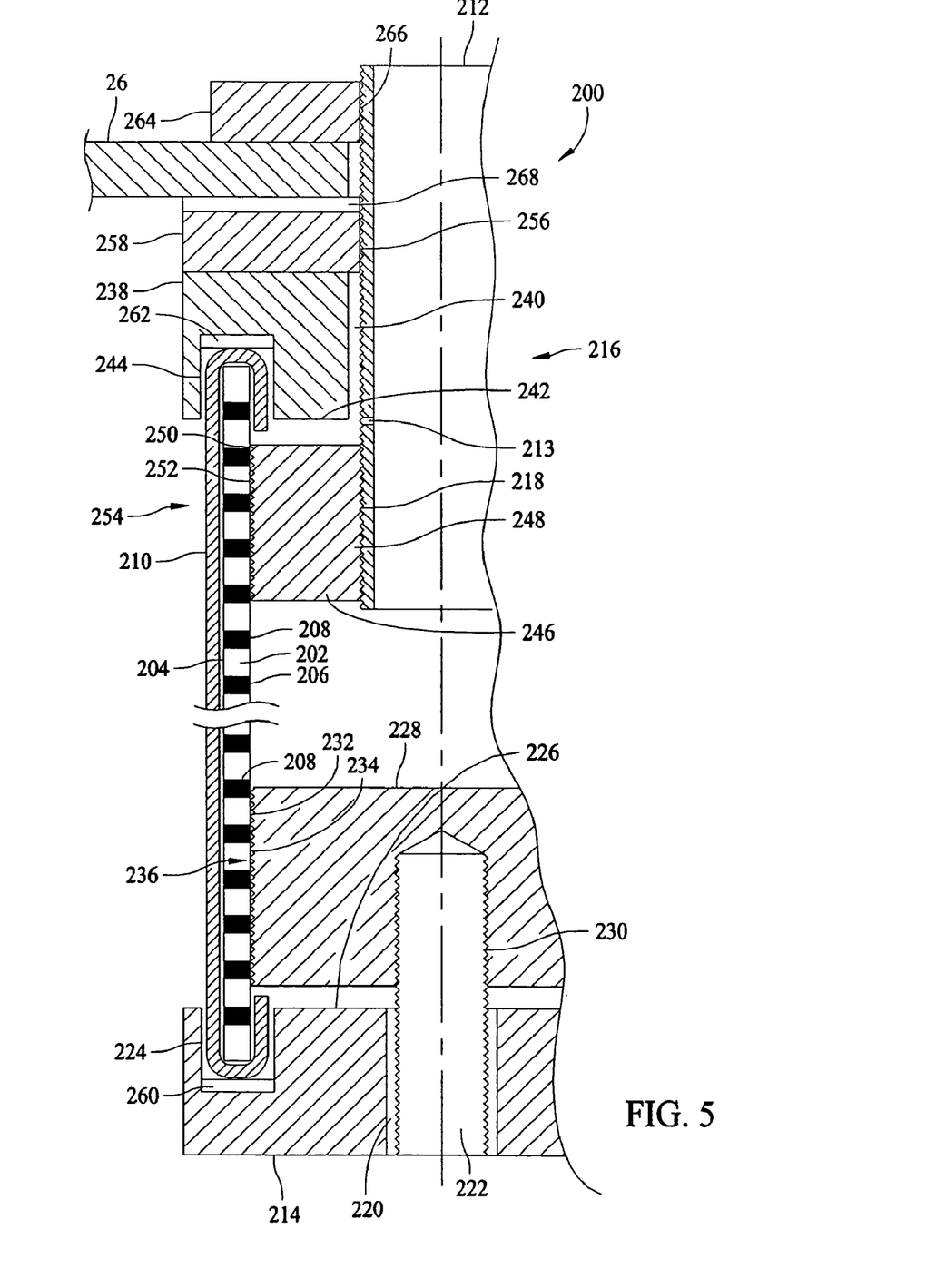
FIG. 5 is a schematic sectional illustration of a candle filter assembly in accordance with another embodiment of the present invention.

FIG. 5 is a schematic sectional illustration of a candle filter element assembly 200 in accordance with another exemplary embodiment. Candle filter element assembly 200, similar to candle filter element assembly 70 described above, includes a tubular outer core 202 having an outer surface 204, an inner surface 206 and a plurality of openings 208 extending through outer core 202 from outer surface 204 to inner surface 206. A filter media 210 surrounds outer surface 204 of outer core 202. A drain pipe 212 having a plurality of drain openings 213 is positioned inside outer core 202. A first portion 216 of drain pipe 212 includes a plurality of threads 218.

A bottom end cap 214 includes an unthreaded bore 220 extending therethrough that is sized to permit a threaded bolt 222 to extend through bottom end cap 214. End cap 214 includes an annular groove 224 in a top surface 226. A bottom counter block 228 is positioned adjacent bottom end cap 214. Bottom counter block 228 includes a threaded bore 230 that is sized to threadingly engage threaded bolt 222. An outer surface 232 of bottom counter block 228 includes a plurality of threads 234 that are sized to threadingly engage a first threaded portion 236 of inner surface 206 of outer core 202. In an alternate embodiment, outer surface 232 of bottom counter block 228 does not include threads, and bottom counter block 228 is attached to outer core 202 by any suitable method, for example, welding, adhesive bonding, and/or fasteners.

A top sealing block 238 includes an unthreaded drain pipe opening 240 extending therethrough that is sized to permit drain pipe 212 to extend through top sealing block 238. Bottom surface 242 of top sealing block 238 includes an annular groove 244. A top counter block 246 is positioned adjacent top sealing block 238. Top counter block 246 includes a threaded bore 248 extending therethrough that is sized to threadingly engage threaded drain pipe threaded portion 216. An outer surface 250 of top counter block 246 includes a plurality of threads 252 that are sized to threadingly engage a second threaded portion 254 of inner surface 206 of outer core 202. Drain pipe 212 threaded portion 216 is sized to threadingly engage threaded bore 248 of top counter block 246 and engage a threaded bore 256 extending through a compression nut 258. In an alternate embodiment, outer surface 250 of top counter block 246 does not include threads, and top counter block 246 is attached to outer core 202 by any suitable method, for example, welding, adhesive bonding, and/or fasteners.

Candle filter assembly 200 is assembled by positioning filter media 210 around outer surface 204 of outer core 202 and threading outer core 202 onto bottom counter block 228. Bottom end cap 214 is then attached to bottom counter block 228 by threaded bolt 222 with the proximate end of outer core 202 and filter media 210 received in annular groove 224 of end cap 214. A compressible seal gasket 260 is positioned in annular groove 224. Tightening threaded bolt 222 moves bottom end cap 214 towards bottom counter block which compresses seal gasket 260 forming a seal between filter media 210 and bottom end cap 214.

Top counter block 246 is threaded onto second threaded portion 254 of outer core 202 and drain pipe 212 is threadingly coupled to top counter block by threading drain pipe threaded portion 216 into threaded bore 248 of top counter block 246. Top sealing block 238 is slid on to drain pipe 212 and positioned adjacent top counter block 246 with outer core 202 and filter media 210 received in annular groove 244 of top sealing block 238, and compression nut 258 is threaded onto threaded portion 216 of drain pipe 212. A compressible seal gasket 262 is positioned in annular groove 244 between filter media and top sealing block 238. Tightening compression nut 258 moves top sealing block 238 towards top counter block 246 causing seal gasket 262 to compress forming a seal between filter media 210 and top sealing block 238.

Candle filter assembly 200 is mounted to pipe sheet 26 by use of a mounting nut 264 which includes a threaded bore 266 sized to engage threaded portion 216 of drain pipe 212. A compressible seal gasket 268 is positioned between compression nut 258 and pipe sheet 26.

While the invention has been described in terms of various specific embodiments, those skilled in the art will recognize that the invention can be practiced with modification within the spirit and scope of the claims.

What is claimed is:

1. A candle filter element assembly for a filter device, said candle filter assembly comprising:
    a tubular core having an outer surface, an inner surface, and end surfaces extending between said outer and inner surfaces, and comprising a plurality of openings extending therethrough;
    a filter media supported by said outer core to define a core and filter media subassembly, said filter media substantially flush against said tubular core outer surface and at least one of said end surfaces;
    a drain pipe defined by a tubular surface with a plurality of openings extending therethrough to permit fluid to flow between an outer surface of said drain pipe and an inside of said drain pipe, said drain pipe located inside outer core;
    an end cap coupled to said drain pipe;
    a first sealing block comprising a drain pipe opening, said drain pipe extendable through said drain pipe opening in said first sealing block;
    a compression nut for threadingly engaging said drain pipe extending through said first sealing block, said drain pipe comprising a distal threaded end portion, said distal threaded end portion threadingly engaging said compression nut;

a first counter block threadingly engaging said distal threaded end portion of said drain pipe, said first counter block comprising;

a body comprising a threaded bore extending therethrough;

an annular projection extending from said body and sized to be received in an annular groove in said first block; and an annular notch in an outer surface of said body, said annular notch sized to receive said outer core.

2. A candle filter element assembly in accordance with claim 1 wherein said end cap comprises an annular groove sized to receive said outer core and filter media subassembly, said first sealing block comprises an annular groove sized to receive said outer core and filter media subassembly, and said candle filter assembly further comprises:

a first seal gasket positioned in said groove of said end cap to create a liquid seal between said end cap and said outer core and filter media subassembly; and a second seal gasket positioned in said groove of said first sealing block to create a liquid seal between said first sealing block and said outer core and filter media subassembly.

3. A candle filter element assembly in accordance with claim 1 wherein said end cap comprises a threaded bore and said drain pipe further comprises a proximate threaded end portion, said proximate threaded end portion adapted to threadingly couple to said threaded bore of said end cap.

4. A candle filter element assembly in accordance with claim 1 further comprising a second sealing block comprising an annular groove, said second sealing block positioned adjacent said end cap.

5. A candle filter element assembly in accordance with claim 4 further comprising a second counter block adapted to threadingly engage a proximate threaded end portion of said drain pipe, said second counter block comprising:

a body comprising a threaded bore extending therethrough;

an annular projection extending from said body and sized to be received in said annular groove of said second sealing block; and an annular notch in an outer surface of said body, said notch sized to receive said outer core.

6. A candle filter element assembly in accordance with claim 5 further comprising:

a first seal gasket positioned in said groove of said first sealing block to create a liquid seal between said first sealing block and said outer core and filter media subassembly; and a second seal gasket positioned in said groove of said second sealing block to create a liquid seal between said second sealing block and said outer core and filter media subassembly.

7. A candle filter element assembly in accordance with claim 1 wherein said end cap comprises an unthreaded bore extending therethrough, and an annular groove sized to receive said outer core and filter media subassembly, and said first sealing block comprising an annular groove sized to receive said outer core and filter media subassembly.

8. A candle filter element assembly in accordance with claim 7 further comprising a first counter block adapted to threadingly engage a proximate threaded portion of said drain pipe, said first counter block comprising:

a threaded bore extending therethrough and sized to threadingly engage said proximate threaded portion of said drain pipe; and an outer circumferential surface, said inner surface of said core attached to said outer circumferential surface of said first counter block.

9. A candle filter element assembly in accordance with claim 8 further comprising a second counter block and a threaded bolt, said second counter block comprising:

a threaded bore extending therethrough and sized to threadingly engage said threaded bolt; and an outer circumferential surface, said inner surface of said core attached to said outer circumferential surface of said second counter block;

said threaded bolt sized to extend through said unthreaded bore of said end cap.

10. A liquid filtration device comprising:

a filter housing;

a removable housing cover coupled to and sealing said filter housing;

a filter support element positioned inside said filter housing; and at least one candle filter element assembly mounted to said filter support element and positioned inside said filter housing, each said candle filter element assembly comprising;

a tubular core having an outer surface, an inner surface, and end surfaces extending between said outer and inner surfaces, and comprising a plurality of openings extending therethrough;

a filter media supported by said outer surface of said core defining a core and filter media subassembly, said filter media substantially flush against said tubular core outer surface and at least one of said end surfaces;

a drain pipe comprising a plurality of openings extending therethrough to permit fluid to flow between an outer surface of said drain pipe and an inside of said drain pipe, said drain pipe located inside said core;

an end cap coupled to said drain pipe;

a first sealing block comprising a drain pipe opening, said drain pipe extending through said drain pipe opening in said first sealing block;

a compression nut threadingly engaging said drain pipe extending through said first sealing block, said drain pipe comprising a distal threaded end portion, said distal threaded end portion threadingly engaging said compression nut;

a first counter block threadingly coupled to said distal threaded end portion of said drain pipe, said first counter block comprising:

a body comprising a threaded bore extending therethrough;

an annular projection extending from said body and sized to be received in an annular groove in said first sealing block; and an annular notch in an outer surface of said body, said annular notch sized to receive said outer core.

11. A liquid filtration device in accordance with claim 10 wherein said end cap comprises an annular groove sized to receive said outer core and filter media subassembly, said first sealing block comprises an annular groove sized to receive said outer core and filter media subassembly, and said candle filter assembly further comprises:

a first seal gasket positioned in said groove of said end cap to create a liquid seal between said end cap and said outer core and filter media subassembly; and a second seal gasket positioned in said groove of said first sealing block to create a liquid seal between said first sealing block and said outer core and filter media subassembly, said filter media second portion extends between said second seal gasket and said tubular core.

12. A liquid filtration device in accordance with claim 10 wherein said end cap comprises a threaded bore and said drain pipe further comprises a proximate threaded end portion, said proximate threaded end portion threadingly coupled to said threaded bore of said end cap.

13. A liquid filtration device in accordance with claim 10 further comprising a second sealing block comprising an annular groove, said second sealing block positioned adjacent said end cap.

14. A liquid filtration device in accordance with claim 13 further comprising a second counter block threadingly coupled to a proximate threaded end portion of said drain pipe, said second counter block comprising:
 a body comprising a threaded bore extending therethrough;
 an annular projection extending from said body and sized to be received in said circular groove of said second sealing block; and
 an annular notch in an outer surface of said body, said notch sized to receive said outer core.

15. A liquid filtration device in accordance with claim 14 further comprising:
 a first seal gasket positioned in said groove of said first sealing block to create a liquid seal between said first sealing block and said outer core and filter media subassembly; and
 a second seal gasket positioned in said groove of said second sealing block to create a liquid seal between said second sealing block and said outer core and filter media subassembly.

16. A liquid filtration device in accordance with claim 14 wherein said end cap comprises an unthreaded bore extending therethrough, and an annular groove sized to receive said outer core and filter media subassembly, and said first sealing block comprising an annular groove sized to receive said outer core and filter media subassembly.

17. A liquid filtration device in accordance with claim 16 further comprising a first counter block threadingly coupled to a threaded portion of said drain pipe, said first counter block comprising:
 a threaded bore extending therethrough and sized to threadingly engage said threaded portion of said drain pipe; and
 an outer circumferential surface, said inner surface of said core attached to said outer circumferential surface of said first counter block.

18. A liquid filtration device in accordance with claim 17 further comprising a second counter block and a threaded bolt, said second counter block comprising:
 a threaded bore extending therethrough and sized to threadingly engage said threaded bolt; and
 an outer circumferential surface, said inner surface of said core attached to said outer circumferential surface of said second counter block;
 said threaded bolt sized to extend through said unthreaded bore of said end cap.

* * * * *

UNITED STATES PATENT AND TRADEMARK OFFICE
CERTIFICATE OF CORRECTION

PATENT NO.         : 7,487,875 B2                                             Page 1 of 1
APPLICATION NO.    : 11/215209
DATED              : February 10, 2009
INVENTOR(S)        : Zimmerman et al.

It is certified that error appears in the above-identified patent and that said Letters Patent is hereby corrected as shown below:

In Claim 1, column 7, line 3, delete "comprising;" and insert therefor --comprising:--.
In Claim 1, column 7, line 6, between "first" and "block" insert --sealing--.
In Claim 10, column 8, beginning on line 19, delete "comprising;" and insert therefor --comprising:--.

Signed and Sealed this

Fourteenth Day of April, 2009

JOHN DOLL
*Acting Director of the United States Patent and Trademark Office*